United States Patent
Achten et al.

(10) Patent No.: US 11,192,293 B2
(45) Date of Patent: *Dec. 7, 2021

(54) PROCESS FOR PRODUCING 3D STRUCTURES FROM RUBBER MATERIAL

(71) Applicant: Covestro Deutschland AG, Leverkusen (DE)

(72) Inventors: Dirk Achten, Leverkusen (DE); Thomas Büsgen, Leverkusen (DE); Dirk Dijkstra, Odenthal (DE); Roland Wagner, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 226 days.

This patent is subject to a terminal disclaimer.

(21) Appl. No.: 16/315,872

(22) PCT Filed: Jul. 7, 2017

(86) PCT No.: PCT/EP2017/067066
§ 371 (c)(1),
(2) Date: Jan. 7, 2019

(87) PCT Pub. No.: WO2018/007579
PCT Pub. Date: Jan. 11, 2018

(65) Prior Publication Data
US 2019/0240896 A1  Aug. 8, 2019

(30) Foreign Application Priority Data
Jul. 8, 2016 (EP) ..................... 16178646

(51) Int. Cl.
*B29C 64/124* (2017.01)
*B33Y 70/00* (2020.01)
*B29C 64/00* (2017.01)
*B29K 105/00* (2006.01)
*B33Y 10/00* (2015.01)
*B33Y 80/00* (2015.01)

(52) U.S. Cl.
CPC ............ *B29C 64/124* (2017.08); *B29C 64/00* (2017.08); *B33Y 70/00* (2014.12); *B29K 2105/0094* (2013.01); *B33Y 10/00* (2014.12); *B33Y 80/00* (2014.12)

(58) Field of Classification Search
CPC ............ B29K 2007/00; B29K 2011/00; B29K 2019/00
See application file for complete search history.

(56) References Cited

U.S. PATENT DOCUMENTS

| | | | | |
|---|---|---|---|---|
| 5,807,437 A | * | 9/1998 | Sachs | B29C 41/12 118/688 |
| 6,067,480 A | | 5/2000 | Stuffle et al. | |
| 6,165,406 A | * | 12/2000 | Jang | B33Y 30/00 264/308 |
| 6,658,314 B1 | * | 12/2003 | Gothait | B33Y 70/00 700/119 |
| 7,645,833 B2 | * | 1/2010 | Achten | C08L 13/00 525/230 |
| 9,321,312 B2 | * | 4/2016 | Asper | B60C 7/10 |
| 9,889,617 B2 | * | 2/2018 | Erdman | B29C 64/245 |
| 2006/0032569 A1 | * | 2/2006 | Zimmer | G09F 7/165 152/524 |
| 2009/0099317 A1 | * | 4/2009 | Achten | C08L 67/00 525/387 |
| 2019/0248067 A1 | * | 8/2019 | Achten | B29C 64/153 |

FOREIGN PATENT DOCUMENTS

| | | | |
|---|---|---|---|
| CN | 104761761 A | | 7/2015 |
| CN | 105646959 A | * | 6/2016 |
| EP | 2177557 A1 | | 4/2010 |
| JP | 2007051237 A | | 3/2007 |

OTHER PUBLICATIONS

International Search Report for PCT/EP2017/067066 dated Oct. 9, 2017.
Written Opinion of the International Searching Authority for PCT/EP2017/067066 dated Oct. 9, 2017.

* cited by examiner

*Primary Examiner* — Benjamin A Schiffman
(74) *Attorney, Agent, or Firm* — Jed C. Benson

(57) ABSTRACT

A process is described for producing a three dimensional structure, the process including the following steps a) applying of at least a first material $M_1$ onto a substrate to build a first layer $L_1$ on the substrate; b) layering of at least one further layer $L_y$ of the first material $M_1$ or of a further material $M_x$ onto the first layer $L_1$, wherein the at least one further layer $L_y$ covers the first layer $L_1$ and/or previous layer $L_{y-1}$ at least partially to build a precursor of the three dimensional structure; c) curing the precursor to achieve the three dimensional structure; wherein at least one of the materials $M_1$ or $M_x$ provides a Mooney viscosity of >10 ME at 60° C. and of <200 ME at 100° C. before curing. Also, a three dimensional structure is described which is available according to the process according to the invention.

8 Claims, No Drawings

PROCESS FOR PRODUCING 3D STRUCTURES FROM RUBBER MATERIAL

CROSS-REFERENCE TO RELATED APPLICATIONS

This application is a national stage application (under 35 U.S.C. § 371) of PCT/EP2017/067066, filed Jul. 7, 2017, which claims benefit of European Application No. 16178646.2, filed Jul. 8, 2016, both of which are incorporated herein by reference in their entirety.

The present invention provides a process for producing a three dimensional structure by applying at least two layers of at least one material $M_1$ or $M_x$ on a substrate to form a precursor and curing the materials, wherein at least one of the materials has a Mooney viscosity of >10 ME at 60° C., preferably of >10 ME at 60° C. before curing, and of <200 ME at 100° C., preferably of <200 ME at 100° C., before curing. The invention further provides a three dimensional structure resulting from the inventive process.

BACKGROUND OF THE INVENTION

Several materials have been described as suitable for additive manufacturing processes, especially 3D printing, which all show a complex viscosity of below 50.000 mPas at room temperature measured in a standard oscillatory shear viscosimetry equipment (e.g. by Anton Paar) at shear rates≤1/s.

A state of the art apparatus and method for layered deposition of high strength engineering polymers to manufacture durable three-dimensional objects is disclosed in U.S. Pat. No. 6,067,480. Feed rods of the polymer are extruded from an extrusion cylinder using a piston which is displaced into a cylinder, providing high pressure extrusion accommodating polymers having low melt flow and long chain lengths. U.S. Pat. No. 6,067,480 B1 discloses that feed rods of polycarbonate, polyaryletherketone and poly(methylmethacrylate) were successfully extruded using the extrusion cylinder apparatus. However the described apparatus focuses as a necessary means of extrusion on liquifying a thermoplastic material at temperatures of 185° to above 400° C.

There exists no technology in 3D printing that allows to work with materials that are liquid but of ultra-high viscosity at room temperature.

BRIEF SUMMARY OF THE INVENTION

One problem addressed by the present invention was therefore to avoid at least one of the disadvantages of the prior art.

A further problem addressed by the present invention, was to produce a three dimensional structure in diversified geometries which provide a high elasticity combined with a high stability, a high tensile strength or a high elongation before break.

Furthermore, the problem was addressed by the present invention, to provide a material that can be processed without phase change in the liquid state.

A further problem addressed by the present invention, was to provide a material that (chemically) cured to a temperature shape stable rubbery material during and after processing without losing the intended shape achieved in a suitable 3D printing process.

DETAILED DESCRIPTION OF THE INVENTION

At least one of the mentioned problems is solved by a process for producing a three dimensional (3D) structure, the process including the following steps
  a) applying of at least a first material $M_1$ onto a substrate building a first layer $L_1$ on the substrate;
  b) layering of at least one further layer $L_y$ of the first material $M_1$ or of a further material $M_x$ onto the first layer $L_1$, wherein the at least one further layer $L_y$ covers the first and/or previous layer $L_{y-1}$ at least partially to build a precursor of the three dimensional structure;
  c) curing the precursor to achieve the three dimensional structure;
wherein at least one of the materials $M_1$ or $M_x$ provides a Mooney viscosity of >10 ME at 60° C., preferably of >10 ME at 60° C. before curing, and of <200 ME at 100° C., preferably of >200 ME at 100° C. before curing. Preferably, x ranges from 2 to 100, or preferably from 3 to 50, or preferably from 4 to 20. Preferably, y ranges from 2 to 100000, or preferably from 3 to 50000, or preferably from 4 to 20000, or preferably from 5 to 10000, or preferably from 10 to 5000, or preferably from 10 to 1000, or preferably of 10 to 100000.

The Mooney viscosity is measured according to DIN 53523.

Preferably, the first material $M_1$ provides a Mooney viscosity of >20 ME at 60° C. and of <200 ME at 100° C. before curing, or >30 ME at 60° C. and of <200 ME at 100° C. before curing, or >50 ME at 60° C. and of <200 ME at 100° C. before curing. Preferably, the first material $M_1$ provides a Mooney viscosity of >20 ME at 60° C. and of <190 ME at 100° C. before curing, or >30 ME at 60° C. and of <180 ME at 100° C. before curing, or >50 ME at 60° C. and of <170 ME at 100° C. before curing. Preferably, the further material $M_x$ provides a Mooney viscosity of >20 ME at 60° C. and of <200 ME at 100° C. before curing, or >30 ME at 60° C. and of <200 ME at 100° C. before curing, or >50 ME at 60° C. and of <200 ME at 100° C. before curing. Preferably, the further material $M_x$ provides a Mooney viscosity of >20 ME at 60° C. and of <190 ME at 100° C. before curing, or >30 ME at 60° C. and of <180 ME at 100° C. before curing, or >50 ME at 60° C. and of <170 ME at 100° C. before curing. The expression "before curing" refers to all viscosity values, particularly for both temperatures mentioned, especially at 60° C. and at 100° C.

Preferably, the first material $M_1$ provides a Mooney viscosity of ≥20 ME at 60° C. before curing and of <200 ME at 100° C. before curing, or ≥30 ME at 60° C. before curing and of <200 ME at 100° C. before curing, or ≥50 ME at 60° C. before curing and of ≤200 ME at 100° C. before curing. Preferably, the first material $M_1$ provides a Mooney viscosity of ≥20 ME at 60° C. before curing and of ≤150 ME at 100° C. before curing, or ≥30 ME at 60° C. before curing and of ≤130 ME at 100° C. before curing, or ≥50 ME at 60° C. before curing and of ≤110 ME at 100° C. before curing. Preferably, the further material $M_x$ provides a Mooney viscosity of ≥20 ME at 60° C. before curing and of <200 ME at 100° C. before curing, or ≥30 ME at 60° C. before curing and of <200 ME at 100° C. before curing, or ≥50 ME at 60° C. before curing and of <200 ME at 100° C. before curing. Preferably, the further material $M_x$ provides a Mooney viscosity of ≥20 ME at 60° C. before curing and of ≤150 ME at 100° C. before curing, or ≥30 ME at 60° C. before curing and of ≤130 ME at 100° C. before curing, or ≥50 ME at 60° C. before curing and of ≤110 ME at 100° C. before curing.

By the inventive process the use of ultra-high viscosity liquid materials in additive manufacturing is enabled. Ultra-high viscosity liquids according to the invention are liquids with a viscosity higher than $10^5$ mPas, preferably $\geq 5*10^5$ mPas, preferably $\geq 1*10^6$ mPas, preferably $\geq 2*10^6$ mPas, measured at 25° C. by an oscillatory shear viscosimeter at a shear rate of 1/s. Preferably, no phase transition of any of the materials $M_1$ or $M_x$ is involved during any of the process steps a) to c), or preferably during steps a) and b). The three dimensional structure preferably shows no phase transition above 50° C., preferably above 25° C. (RT). Preferably, the resulting three dimensional structure is temperature shape stabile. Temperature shape stabile according to the invention means that the shape of the three dimensional structure does not alter in any dimension X, Y or Z more than 20%, or preferably not more than 15%, or preferably not more than 10% compared to the original shape in these directions. Preferably, the three dimensional structure does not alter its extension in any of the dimensions X, Y or Z of more than 5 cm, or preferably of more than 3 cm, or preferably of more than 1 cm, or preferably of more than 5 mm, or preferably of more than 3 mm, or preferably of more than 1 mm during its shelf-life at room temperature (25° C.) and normal pressure (1013 mbar) if no further forces are applied to the three dimensional structure.

In a further preferred embodiment of the process the three dimensional structure may be built in a building volume, in form of a container where only a part of the three dimensional structure or the precursor of the three dimensional structure is kept under atmospheric pressure. Therefore, preferably solely the upper layers (preferably layer 1 up to layer 100 counted from the actual building layer downwards) are under atmospheric pressure while the layers below can be immersed in a different material. A different material means any material but air. The different material is preferably a liquid which might be heated or cooled. Preferably, the liquid, is a material showing similar flowing behavior like, water, silicone oil, organic/inorganic oils. Alternatively, flowable materials like sand, micro glass-perls or combinations thereof are preferred. Preferably, the different material allows to minimize gravity forces on the three dimensional structure during the printing process. In a further preferred embodiment the three dimensional structure is pre-cured on the surface of the substrate by applying a hot air stream with a temperature of $\geq 200°$ C., or preferably of $\geq 250°$ C., or preferably of $\geq 280°$ C. The pre-curing by applying hot air to the three dimensional structure is preferably established for less than 5 minutes, preferably of less than 3 minutes, preferably of less than 2 minutes. The applied air speed is preferably equal or above 10 cm/s, or preferably equal or above 50 cm/s, or preferably equal or above 100 cm/s, across the whole outer surface of the three dimensional structure during or after building and before final curing takes place. Thus, the surface of the three dimensional structure when built is preferably stabilized by pre-curing during or after the build or producing process, before the whole built 3D structure is heated for final curing.

The three dimensional structure preferably is highly mechanically stable after full curing and comprises a temperature dependent modulus of elasticity, also called E'-modulus or modulus E'. Preferably, the loss of the E'-modulus, also called modulus E', of the cured material $M_{1c}$ or $M_{xc}$ provided by a comparison of the E'-modulus at a temperature of 25° C. to the E'-modulus at a temperature of 150° C. is less than 80%, or preferably less than 70%, or preferably less than 60%. This behavior is as expected for materials with a distinct rubber plateau between 25° C. and 150° C.

The applying step a) can be performed by any method the person skilled in the art would select for applying material $M_1$ to a substrate. The applying step a) preferably is performed by an application tool. The application tool can be any tool the person skilled in the art would select for applying material $M_1$ to a substrate or layering the further material $M_x$ onto the previous layer $L_{y-1}$, preferably in a defined way. The application tool preferably is part of a mixing and transportation tool. The mixing and transportation tool preferably is selected from the group consisting of a one screw, two screw or triple screw extruder, a pneumatic driven piston, a piezo driven piston, a gear driven piston, a gear pump, a pressure feeder, a two wheel feeder, a spiked wheel feeder or a combination of at least two thereof. In a preferred embodiment of the process the mixing and transportation tool is selected from the group consisting of a screw extruder, a piston extruder, a gear pump or a combination of at least two thereof. Preferably, the material $M_1$ or $M_x$ is fed into the piston or screw extruder head in the form selected from the group consisting of beads, strips, strings, pellets, skins, foils, bales or a combination of at least two thereof. The extruder or piston feed preferably works as a batch or as a continuous process via a secondary roller feed process, a rotational screw feed or a combination hereof. Alternatively, a secondary piston feed as a batch process, or an alternating twin piston feed to achieve a continuous process could be applied. Preferably, the extruder, particularly the extruder head which is coupled to or comprises the application tool is equipped with a heater and/or cooler jacket barrel. In a preferred embodiment of the process the extruder uses the energy of the mixing and transportation process for direct heating of the material. The feeding technologies, to feed the first material $M_1$ or any further material $M_x$ to the mixing and transportation tool, which are useful to handle ultra-high viscosity liquids are well known to the technical community processing rubber materials.

Examples of piston and screw extruders that are suitable for such a process could be composed of a pre-plasticizing and injection unit for the material combined with a heating or cooling system and an electronic control system. Producers of such machines are known machine manufacturers like Arburg GmbH+Co KG (Germany) e.g. the Arburg Freeformer, Klockner DESMA Elastomertechnik GmbH (Germany), KraussMaffei Technologies GmbH (Germany), Dr. Boy GmbH & Co. KG (Germany), REP INTERNATIONAL (FRANCE), ABB Deutschland (Germany), BEKUM Maschinenfabriken GmbH (Germany), Bürkle GmbH (Germany), Engel Austria GmbH (Austria).

Preferably, the applied first material $M_1$ or the layered material $M_x$ is applied or layered in the form of droplets, lines, beads, strips, foils, or a combination of at least two thereof. The thickness of the applied first material $M_1$ or any of the further materials $M_x$ at its narrowest point of the respective layer is preferably in the range of from 0.1 mm to 1 m, or preferably in the range of from 0.3 mm to 0.1 m, or preferably in the range of from 0.5 mm to 0.01 m.

Preferably, layering step b) is performed in the same manner as applying step a) with the difference that the further material $M_x$ is not applied to the substrate but at least partially onto the first layer $L_1$. Preferably, the applying in step a) or the layering in step b) is performed in a space-resolved manner. Space-resolved in the sense of the invention means that the position as well as the amount and shape of the first material $M_1$ or of the further material $M_x$ is applied to the substrate or layered onto the previous layer $L_{y-1}$ in a way that a formation of the three dimensional structure in a predefined way is achieved. Preferably, the repeated layering of the further material $M_x$ results in a material growth in at least one, or preferably in at least two, or preferably in each spatial direction.

Preferably, the applying of the first material $M_1$ or of the further material $M_x$ is an extrusion of material in form of droplets or lines through a high viscosity capable application tool preferably positioned at the extrusion head. Preferably, the material $M_1$ or $M_x$ is applied via the application tool by suitable heat resistant nozzles, also called "dies". Preferably, the opening of the application tool and/or the extrusion head, has an incorporated material heating and or cooling device, for example in the form of a heating or cooling chamber. Preferably, the first material $M_1$ or the further material $M_x$ is kept in the heating or cooling device at the processing temperature for a minimum time of 0.1 second and a maximum time of 5 times the time needed to build the intended three dimensional structure. The processing temperature according to the invention is the temperature at the inside of the application tool, e.g. the die, during the process in one of the steps a), b), where the material leaves the application tool. Preferably, the processing temperature is the highest temperature which is applied to the material $M_1$ or $M_x$ during the process. This temperature is preferably applied via the application tool which is preferably only exceeded by the temperature when curing in step c).

For the formation of a three dimensional structure with y further layers $L_y$, with y ranging from 2 to 100000, step b) is repeated y−1 times. Each further layer $L_y$ is superimposed on the previous layer $L_{y-1}$. For the building of the precursor of the three dimensional structure step b) is repeated as often as needed to form the final number of layers building the three dimensional structure is reached. In a preferred embodiment of the process, the application step a) and the at least one layering step b) are performed in a continuous manner. Preferably, the material of the plurality of layers $L_1$ to $L_y$ is selected from the same material $M_1$. Alternatively, material $M_1$ differs from at least one of the further materials $M_x$ by at least one ingredient. In a preferred embodiment of the process, at least one layer selected from the group consisting of $L_1$ to $L_y$ is formed in step a) or step b) by utilizing at least two different materials $M_1$ to $M_x$.

Preferably, at least a part of the applying step a) or the layering step b) or both are performed at a temperature where the Mooney viscosity of the first material $M_1$ or the further material $M_x$ is reduced by at least 50%, or preferably by at least 60%, or preferably by at least 70% compared to the Mooney viscosity of these materials at 60° C. Preferably, at least one of the steps, the applying step a) or the layering step b) or both are performed at a material temperature in a range of from 50 to 250° C.

Preferably, at least a part of the applying step a) or the layering step b) or both are performed at a temperature and shear rate where the viscosity of the first material $M_1$ (e.g. measured as Mooney viscosity or as complex viscosity in a Göttfert capillary viscosimeter) or the further material $M_x$ is reduced by at least 50%, or preferably by at least 60%, or preferably by at least 70% compared to the viscosity of these materials measured by the same method at 60° C. Preferably, at least one of the steps, the applying step a) or the layering step b) or both are performed at a material temperature in a range of from 50 to 250° C.

In step b) the further layer $L_y$ preferably superimposes the first layer $L_1$ or $L_{y-1}$ to an extent ranging from 1% to 100%, or preferably from 5% to 100%; or preferably from 10% to 100%; or preferably from 15% to 100%; or preferably from 20% to 100%, or preferably from 25% to 100% related to the total surface of the first layer $L_1$ or the previous layer $L_{y-1}$ which is not in contact with any previous layer. Preferably, the first layer $L_1$ is in direct contact with the further layer $L_y$. Preferably, step b) comprises at least 10, or preferably at least 50, or preferably at least 100, or preferably at least 1000, or preferably at least 100000 further layers $L_y$. In the context of the invention the previous layer $L_{y-1}$ can be the first layer $L_1$ or any further layer $L_{y-1}$, where the further layer $L_y$ is layered upon.

The substrate where the first layer $L_1$ is applied to can be any substrate the person skilled in the art would select to form a three dimensional structure on. Preferably, the substrate has at least one surface where the layer $L_1$ to $L_y$ are applied on. Preferably, the material of the substrate is selected from the group consisting of a metal, a polymer, a ceramic, a glass, a wood or a combination of at least two thereof. Preferably, the surface comprises a material selected from the group consisting of iron, preferably steel, a glass preferably silicate or borosilicate based, a polymer with release properties like silicones, polyimides, fluoropolymers etc. In a preferred embodiment of the process, the substrate is an intended part of the desired 3D structure and is selected from the group consisting of a metal, a polymer, a ceramic, a glass, a wood or a combination of at least two thereof. Preferably, the substrate comprises a metal or a polymer. The surface of the substrate preferably is flat in a sense that the surface has a roughness of below 5 mm. In a preferred embodiment of the process, the surface is a plane with a curvature radius >5 cm at least in the area where the first layer $L_1$ is applied to.

Preferably, the dimension of the surface is larger than the surface of at least the first layer $L_1$ being in contact with the surface. The shape of the substrate can be any shape the person skilled in the art would select for producing a three dimensional structure. Preferably, the shape of the surface of the substrate is selected from the group consisting of round, oval, angular, polygonal or a combination of at least two thereof. The size of the surface of the substrate is preferably in the range of from 1 $cm^2$ to 100 $m^2$, or preferably in the range of from 10 $cm^2$ to 50 $m^2$, or preferably in the range of from 1 $m^2$ to 20 $m^2$.

In a preferred embodiment the substrate is part of a formation tool. Preferably, the formation tool is formed as a box with at least one vertical wall. The at least one wall may comprise any material the person skilled in the art would use to form the boundary of a formation tool. Preferably, the substrate is part of a platform which is arranged to be movable along the at least one vertical wall. The substrate may be removable from the platform or alternatively may be an integrated part of the platform. By moving the platform along the at least one vertical wall the volume of the building volume can be varied. Preferably, the at least one wall together with the substrate build a building volume for the three dimensional structure. Preferably, the building volume is heatable and or coolable. Preferably, the volume of the building volume can be varied in a range of from 0 to 1000 $m^3$, or preferably in a range of from 0.01 to 500 $m^3$, or preferably in a range of from 0.05 to 100 $m^3$, or preferably in a range of from 0.1 to 50 $m^3$. The applying in step a) or the layering in step b) may be performed directly on the surface of the substrate. Alternatively or at least partially additionally, an interlayer may be placed onto the surface onto which the first material $M_1$ is applied. Preferably, only the first material $M_1$ comes into direct contact with the substrate or the interlayer, however depending on the geometry of the three dimensional structure to be build, also at least a part of further layers may come into contact with the substrate or the interlayer. The interlayer may comprise any material the person skilled in the art would choose to be an appropriate surface to apply the first material M1 onto. Preferably, the interlayer is made from glass, paper, textile, fabric, ceramic, stone, wood, metal, polymer, plastic, rubber or any combination of at least two thereof. The interlayer preferably becomes part of the three dimensional structure or alternatively may at least partly be separated from the three dimensional structure after the building of the precursor or after the curing step c). The potential separation of the three dimensional structure from the interlayer or from the substrate preferably is performed before step c) when the precursor has been built or after the curing step c) when the three dimensional structure has been built.

In a preferred embodiment of the process the surface of the substrate or the interlayer is part of the three dimensional structure. In an alternatively preferred embodiment, the substrate or the interlayer is not part of the three dimensional structure.

The first material $M_1$ can be any material providing a Mooney viscosity of >10 ME at 60° C. and of <200 ME at 100° C. before curing. The further material $M_x$ can be any material providing a Mooney viscosity of >10 ME at 60° C. and of <200 ME at 100° C. before curing.

The first material $M_1$ can be any material providing a Mooney viscosity of $\geq 10$ ME at 60° C. before curing and of $\leq 200$ ME at 100° C. before curing. The further material $M_x$ can be any material providing a Mooney viscosity of $\geq 10$ ME at 60° C. before curing and of $\leq 200$ ME at 100° C. before curing.

The Mooney viscosity is measured according to DIN 53523, with the large rotor, 1 min preheating and 4 min measurement interval. (ML 1+4).

Preferably, the first material $M_1$ or the further material $M_x$ comprises a component, hereinafter referred to as "ultra-high viscosity liquid" selected from the group consisting of a natural rubber, a synthetic rubber or a mixture thereof. The synthetic rubber is preferably selected from the group consisting of Thiocol Rubber, EVA (Ethylene Vinyl Acetate Copolymer rubber), FPVC (Flexible Polyvinyl Chloride rubber), FZ rubber (Fluorinated Polyphosphazene Rubber), GPO (Propylene Oxide rubber), HNBR (Hydrogenated Nitrile Butadiene rubber), HSN (Highly Saturated Nitrile rubber), ACM (Acrylic rubber), VAMAC (Polethylen co acrylic-acrylic acid rubber), PNR (Polynorborane rubber), PZ (Polyphosphazene rubber), ABR (Acrylate-butadiene rubber), ACM rubber (Copolymer of ethyl or other acrylates and a small amount of a monomer which facilitates vulcanization), AECO rubber (Terpolymer of allyl glycidyl ether, ethylene oxide and epichlorhydrin), AEM rubber (Copolymer of ethyl or other acrylate and ethylene), AFMU rubber (Terpolymer of tetrafluoroethylene, trifluoronitromsomethane and nitrosoperfluorobutyric), ANM rubber (Copolymer of ethyl or other acrylate and acrylonitrile), AU (Polyester urethane rubber), BIIR (Bromo-isobutene-isoprene rubber (brominated buytl rubber)), BR (Butadiene rubber), CFM (Polychlorotrifluoroethylene rubber), CIIR (Chloro-isobutene-isoprene rubber (chlorinated rubber)), CM (Chlorinated polyethylene rubber), CO (Epichlorhydrin rubber), CR (Chloroprene rubber), CSM (Chlorosulphonated polyethylene rubber), ECO (Ethylene oxide and epichlorhydrin copolymer rubber), EAM (Ethylene-vinyl acetate copolymer rubber), EPDM (Terpolymer of ethylene, propylene and a diene with the residual unsaturated portion of the diene in the side chain rubber), EPM Ethylene-propylene copolymer rubber), EU (Polyether urethane rubber), FFKM (Perfluoro rubber of the polymethylene type having all substituent groups on the polymer chain either fluoro, perfluoroalkyl or perfluoroalkoxy groups), FKM (Fluororubber of the polymethylene type having substituent fluoro and perfluoroalkoxy groups on the main chain), FVMQ (Silicone rubber having fluorine, vinyl and methyl substituent groups on the polymer chain), GPO (Polypropylene oxide rubber), IIR (Isobutene-isoprene rubber (butyl rubber)), IM (Polyisobutene rubber), IR (Isoprene rubber (synthetic)), MQ (Silicone rubber having only methyl substituent groups on the polymer chain), NBR (Nitrile-butadiene rubber (nitrile rubber)), NIR (Nitrile-isoprene rubber), PBR (Pyridine-butadiene rubber), PMQ (Silicone rubber having both methyl and phenyl groups on the polymer chain), PSBR (Pyridine-styrene-butadiene rubber), PVMQ (Silicone rubber having methyl, phenyl and vinyl substituent groups on the polymer chain), Q (Rubber having silicone in the polymer chain), SBR (Styrene-butadiene rubber), T (Rubbers having sulphur in the polymer chain (excluding copolymers based on CR)), VMQ (Silicone rubber having both methyl and vinyl substituent groups in the polymer chain), XNBR (Carboxylic-nitrile butadiene rubber (carboxynitrile rubber)), XSBR (Carboxylic-styrene butadiene rubber).

Preferably, the ultra-high viscosity liquid is selected from the group consisting of Polyacrylic Rubber (ACM), Styrene Butadiene Rubber (SBR), Polysiloxane (SI), Vinyl Methyl Silicone (VMQ), Nitrile rubber (NR), hydrogenated nitrile rubber, (HNBR), carboxylated Nitrile rubber (XNBR), carboxylated hydrogenated Nitrile rubber (XHNBR), Ethylenpropylen copolymer rubber (EPDM), Polychloroprene rubber (CR), Vamac, Fluoro rubber (FKM), Isobutylen rubber (IIR), Polybutadiene rubber (BR) or any blends of these Preferably, the ultra-high viscosity liquid has a degree of crystallinity of below 20%, preferably of below 15%, or preferably of below 10%, or preferably of below 5%. Preferably, the ultra-high viscosity liquid has a melting point of below 50° C., or preferably of below 40° C., or preferably of below 30° C. The ultra-high viscosity liquid or the first material $M_1$ comprising the ultra-high viscosity liquid or any further material $M_x$ comprising the ultra-high viscosity liquid show an observable flow at room temperature under pressure at <20 bar, or preferably at <10 bar, or preferably at <5 bar and specifically lose their crystallinity upon processing with heat or shear below 50° C. Furthermore, the ultra-high viscosity liquids have compared to standard thermoplastic materials a very slow buildup of crystallinity to a steady state that may take more than 2 hours, preferably more than 4 hours, or preferably more than 8 hours since the melting point $T_m$ is very close to room temperature RT (25° C.). Specific examples of ultra-high viscosity liquids showing this behavior are Natural rubber and particularly Polychloroprene rubber types with high trans orientation of the chlorine e.g. the products of the Baypren 200 and 300 series of Lanxess AG, Germany. Further examples of ultra-high viscosity liquids are Ethylenvinylacetat rubber with a high Ethylene content or Ethylenpropylen rubber (EPDM) with a high Ethylene content.

In a preferred embodiment of the invention the first material $M_1$ or any of the further materials $M_x$ comprise an ultra-high viscosity polymer and preferably at least one of the components selected from the group consisting of an organic or inorganic filler, a plasticizer, a metal oxide, anti-degradents (against, oxidation, hydrolysis, yellowing, ozone attack etc.), process aids, a coagent and a curative or a combination of at least two thereof. Further examples of a ultra-high viscosity polymers are polysiloxanes. Examples for the filler, plasticizer, metal oxide, anti-degradant, process aid, coagent or curative are listed below. Examples for an inorganic filler are Carbon black N330 or silica, for a plasticizer are phthalate esters like dioctylphathalate, for a metal oxide is ZnO, for an anti-degradent is Irganox 1010 ((Pentaerythritol Tetrakis(3-(3,5-di-tert-butyl-4-hydroxyphenyl)propionate)), for a process aid is stearic acid, for a coagent are high vinyl polybutadiene, triallyl isocyanurate (TAIC) or mixtures thereof, for a curative is di(tert-butylperoxyisopropyl)benzene like Perkadox 14/40. Furthermore suitable as inorganic fillers are chopped glass fibers/chopped carbon fibers/chopped natural fibers or combinations hereof or any combinations with the other mentioned fillers.

For the formation of the first material $M_1$ or at least one of the further materials $M_x$ from the above mentioned ingredients, all of the selected materials are preferably mixed either on a two-roll mill or with an internal mixer. A combination of a two-roll mill and an internal mixer is also preferred. Preferably, mixing is done by the use of an internal mixer. This is done to improve the quality of the finished compound while also significantly reducing the typical mix times incurred when done on a two-roll mill. Typically, the materials are mixed in a two-pass process in an internal mixer where the first pass through the mixer withholds the cure chemicals and is typically dropped out of the mixer at material temperatures <200° C., preferred <180° C., or preferred <150° C. This, so called master batch is then run through the mixer a second time adding the cure chemicals that are typical radical regenerating species or sulfur donating materials well known to those skilled in the art which cause mostly irreversible curing (crosslinking) of the given highly viscous liquids when heated to their decomposition or activation temperature sand again dropped from the mixer at material temperatures of <180° C., preferably <150° C., or preferably ≤120° C. Preferably, the curing chemicals are added at lower temperature process step to avoid premature curing. Preferably, all mixing steps or at least the second mixing step takes place on a two roll mill.

Milling of most of the described formulations (rubber compounds) can be performed without any precautions. However, rubber compounds tend to build heat quickly; therefore, the use of full cooling capabilities is typically recommended. Preferably, for the first run of the mill the mill gap is set at approximately ¼ inch. It is preferred to ensure a shear action required to finish the mixing process while being thin enough to dissipate any excess heat generated during this process. The mill preferably is fed by a compound from an internal mixer which is positioned above the mill or by feeding a stored compound one sheet at a time to the ends of the mill. After banding the compound on the mill, cross-cutting the compound 5 to 7 times from each end is usually adequate to complete the milling process. Removing the milled compound from the mill can easily be accomplished via automatic systems or by hand.

Preferably, the curative is selected from the group consisting of peroxide or sulfur/sulfur-donor cure systems. Comparisons of sulfur/sulfur-donor and peroxide cured compounds indicate that peroxide curing provides better compression set and heat resistance. Depending on the choice of characteristics the three dimensional structure should have and depending on the choice of temperature and pressure to be applied during the inventive process, the choice of curative is influenced. Since peroxides have different molecular weights and decomposition temperatures, it is imperative to select the correct one based on the criteria noted above. Furthermore, the process ability and cost-effectiveness of producing the three dimensional structure is affected by the choice of materials. As in all peroxide cured material, vulcanization in the presence of oxygen causes reversion and thus can leave a sticky surface on the cured part which is used as an advantage for the inventive layering process, also called 3 printing, of ultra-high viscosity liquid materials at room temperature (25° C.). However, for the final curing step cz) to produce the cured three dimensional structure, especially when using low pressure (≤1.5 bar or <1.5 bar) conditions it is preferable to purge the building volume or surrounding with an inert gas, e.g. $N_2$, $CO_2$, Ar, prior to heating up for curing.

In a preferred embodiment of the process curing agents (e.g. tetraphenylethan and derivatives like Initiator BK from Lanxess AG, Germany) are used that produce no volatile substances during the curing process as this volatile substances in low pressure curing conditions may cause foaming of the produced parts.

In a further preferred embodiment of the process redox reactive curing agents or UV activated curing agents forming sufficient radicals to cause curing of the named ultrahigh viscosity liquids as known from the coatings industry can be used. In a further preferred embodiment curing agents and/or other substances (e.g. blowing agents) intentionally forming volatiles at temperatures above 100° C. are used to provoke foaming of the three dimensional structure. Preferably, the agents provoking the foaming of the first material $M_1$ or any of the further materials $M_x$ are applied only in parts to these materials. By only applying the agents only in parts to the materials $M_1$ or $M_x$ a locally varying of the three dimensional structure can be achieved. Preferably, by bringing different curing agents and blowing agents into the three dimensional structure, also called 3D printing articles, during the curing process different designs of the three dimensional structure can be achieved.

Low double bond containing polymers like EPDM, ACM, HNBR when compared to SBR or NBR, the curing speed tends to be slower; therefore, to increase the curing speed a secondary curative is preferably employed in combination with the primary curative. Long curing times are required when thiazole based (MBTS) or sulfenamide-based (CBS, OBTS) primary curative are used. To speed up the curing process, a small quantity of guanidine-based (DPG) or thiuram-based (TMTM) as secondary curative is preferable in combination with the primary curative. Even when using a thiuram-based (TMTD, TETD) primary curative, the addition of a thiazole based (MBT) as secondary curative will shorten the time required for curing. The use of dithiocarbamate (ZEDC) as the primary curative is undesirable since the scorch time will be shortened.

Preferably, the three dimensional structure comprises the first material $M_1$ in an amount in a range of from 1 wt.-% to 100 wt.-%, or preferably in a range of from 2 to 99 wt.-%, or preferably in a range of from 5 to 90 wt.-%, or preferably in a range of from 10 to 80 wt.-%, referred to the total weight of the three dimensional structure.

Preferably, the three dimensional structure comprises the further material $M_x$ in an amount in a range of from 1 wt.-% to 99 wt.-%, or preferably in a range of from 2 to 95 wt.-%, or preferably in a range of from 5 to 90 wt.-%, or preferably in a range of from 10 to 80 wt.-%, referred to the total weight of the three dimensional structure. The amount of the further material $M_x$ with x ranging from 2 to 100 is the sum of all materials in the three dimensional structure formed in any of steps a) or b) differing from the first material $M_1$.

In a preferred embodiment of the process at least two different materials, the first material $M_1$ and at least a second material $M_2$ are applied in step a) or layered in step b) to form the three dimensional structure. Preferably, at least one of the at least two materials selected from the group consisting of the first material $M_1$, the second material $M_2$, any further material $M_x$ with x ranging from 3 to 100, comprises a material which provides a Mooney viscosity of ≤10 ME at 60° C. before curing. Preferably, the three dimensional structure comprises the material providing a viscosity of ≤10 ME at 60° C. before curing in an amount in a range of from 0.1 to 90 wt.-%, or preferably in a range of from 1 to 80 wt.-%, or preferably in a range of from 5 to 70 wt.-%.

The three dimensional structure preferably provides a volume in a range of from 1 $mm^3$ to 1000 $m^3$, or preferably in a range of from 10 $mm^3$ to 500 $m^3$, or in a range of from 100 $mm^3$ to 50 $m^3$, or in a range of from 0.01 $m^3$ to 1 $m^3$.

The curing step c) can be established in any manner selected by a person skilled in the art which is appropriate for the inventive process. Curing, according to the invention means a raise of hardness of at least one of the materials applied or layered to the substrate of previous layer of at least 1 Shore A grade, or preferably of ate least 3 Shore A grades, or preferably of at least 5 Shore A grades, or preferably of ate least 10 Shore A grades, or preferably of at least 20 Shore A grades. The curing step c) can be started at any stage of the process. Preferably, the finish of the curing step c) is characterized by a raise of the hardness of the at least one material used to build the three dimensional structure in steps a) and b). Preferably, the raise of hardness during the curing step c) is in a range of from 1 to 90 Shore A grades, or preferably in a range of 3 to 70 Shore A grades, or preferably in a range of from 5 to 50 Shore A grades, or preferably in a range of from 10 to 40 Shore A. Preferably, the Mooney viscosity is reduced during the curing step c) by at least 30%, or preferably by at least 50%, or preferably by at least 70%, compared to the Mooney viscosity at 25° C. at at least one point of time during step c). Preferably, the Mooney viscosity is reduced during the curing step c) by at least 30%, or preferably by at least 50%, or preferably by at least 70%, compared to the Mooney viscosity at 60° C. at at least one point of time during step c).

The raise of hardness or the change of viscosity is preferably a result of a crosslinking process of molecules present in the first material $M_1$ or any of the further materials $M_x$. The crosslinking process may be the result of a chemical reaction resulting in a chemical crosslinking or of a physical interaction of the molecules present in the first material $M_1$ or any of the further materials $M_x$.

To execute the curing step c) any measure can be applied that provokes the aforementioned crosslinking process resulting in a change in hardness or viscosity. Preferably, at least one measure is applied to the applied or layered material which provokes the change of hardness as described before. The curing step c) preferably is split into at least two separate steps c1) and c2) which may be performed or initiated independently from each other. If step c) is mentioned the sum of all curing steps c1), c2) to cz), with z ranging from 3 to 10, is meant. The curing step c) preferably comprises at least one measure selected from the group consisting of heating, irradiating, applying humidity or a combination of at least two thereof. The heating is preferably performed at a temperature in a range of from 50 to 250 C. Heating can be performed by any means the person skilled in the art would select for heating a first material $M_1$ or any of the further materials $M_x$. Preferably, the heating is performed by means selected from the group consisting of applying hot air, warming up the surrounding of the materials e.g. the surface, placing a heat source above or below the surface or any combination of two thereof. The irradiating is preferably selected from the group consisting of IR-radiation, VIS and UV-radiation or a combination thereof. Curing or crosslinking by applying humidity may be performed by any means the person skilled in the art would select for humidifying the materials $M_1$ to $M_x$. Preferably, the humidity is applied via warm, humid air. The humidity of the air preferably is in the range of from 50 to 100% relative humidity, whereby the air has a temperature in the range of from 30 to 100° C. The measures may be applied simultaneously or successively. Further preferred ways of curing are heating in a pressurized oven, heating by immersion in a heated liquid e.g. silicone, eutectic liquid salts, or materials with sufficient liquid like behavior like sand, micro glass balls, Teflon powder etc. Preferably, the curing takes place at a homogenous pressure of ≥0.5 bar, or preferably ≥1 bar, or preferably ≥2 bar, or preferably ≥5 bar.

There exist different possibilities to perform temperature or pressure control of the process is steps a) to c). In a preferred embodiment of the process the temperature of the first material $M_1$ or of the further material $M_x$ before applying in step a) or layering in step b) is higher than the temperature after the applying in step a) or the layering in step b), measured directly at the opening of the application tool. To optimize the curing of the first material $M_1$ or the further material $M_x$, the curing process in the material preferably is supported by means selected from the group consisting of irradiation, heating, humidification and prolongation of curing process or both. The irradiation may be applied through any irradiation source the person skilled in the art would select for irradiating such material. Preferably, the irradiation is applied through means selected from the group consisting of an IR laser, an IR beam, IR diode, a UV laser, a UV beam, a UV lamp, a UV diode, a VIS lamp, a VIS diode range or a combination of at least two thereof. The heating preferably is performed by applying a hot environment to the material, wherein the environment might be selected from the group consisting of air, water, oil or a combination of at least two thereof. Also eutectic liquid salts or sand could be used as heated environment at least during the curing step c).

Preferably, the viscosity of the first material $M_1$ or of the further material $M_x$ before applying in step a) or layering in step b) is lower than the viscosity after the applying in step a) or the layering in step b), measured directly at the opening of the application tool.

In a further preferred embodiment of the process the temperature of the first material $M_1$ or of the further material $M_x$ before applying in step a) or layering in step b) is lower than the temperature after the applying in step a) or the layering in step b), measured directly at the opening of the application tool. Preferably, the viscosity of the first material $M_1$ or of the further material $M_x$ before applying in step a) or layering in step b) is higher than the viscosity after the applying in step a) or the layering in step b), measured directly at the opening of the application tool.

Preferably, a good interlayer adhesion of the applied or layered layers $L_1$ to it adjacent layer $L_y$, is achieved. To increase the adhesion between the layers $L_1$ to $L_y$, preferably a certain pressure in a range of from 0.001 to 0.5 bar, or preferably in a range of from 0.01 to 0.1 bar is applied to the already applied and layered layers. Preferably, the viscosity of the applied or layered layers in the range of the viscosity described by the Chang window described as the area of non release PSA or higher (E.P Chang, et al. J. Adhesion, 1991, Vol. 34, pp. 189-200) is achieved. Further or alternatively to the usage of pressure, the applying of an adhesive or compatibilizer is preferred in form of an additional layer $L_a$.

The applying of the adhesive or compatibilizer may be performed in a parallel or consecutive independent process through an independently controlled application process (like spray, jet, extrude or other). It is preferred in the inventive process to apply a suitable interlayer adhesive or compatibilizer that interacts with the previous or next layer to promote interlayer adhesion. Preferably, the additional layer $L_a$ has a thickness in a range of from 1 to 200 μm, or preferably in a range of from 5 to 150 μm, or preferably in a range of from 10 to 100 μm.

In a preferred embodiment of the invention, the residence time at the processing temperature is ≤20%, or preferably ≤15%, or preferably ≤10% of the $t_{80}$ crosslinking time of the material. The $t_{80}$ crosslinking time describes the time where in a rheology experiment at a given temperature 80% of the final modulus of the crosslinking material formulation is reached. The measurement of the $t_{80}$ time is preferably performed in a vulcanising rheometer which is preferably based on a moving die rheometer as for example the RheoCheck Profile—MD from Gibitre Instruments in Italy. The $t_{100}$ crosslinking time is the time that is needed to achieve the maximum modulus achievable in the respective curing step, for example in curing step c). In case of the use of sulfur based curing agents, a too long curing time may result in a reversion or reduction of the crosslinking density also observable as a reduction of the modulus. Preferably, the process is performed where a reversion or reduction of the crosslinking density is avoided. If more than one curing step is performed in the process at least three different two crosslinking times can be differentiated. One crosslinking time correlated to the first curing step c1) is called $t_{100c1}$, if necessary one crosslinking time related to the second curing step c2) is called $t_{100c2}$ and if necessary further crosslinking times for any of curing step cz). The total crosslinking time related to the sum of all crosslinking steps c1) to cz) is called $t_{100c}$.

Preferably, a second curing step c2) is performed after curing step c1). In the second curing step c2) the same or a different crosslinking reaction is performed than in the first curing step c2). Preferably, by performing the first curing step c1) 90%, or preferably 80%, or preferably 60%, or preferably 50% of the final crosslinking density of the three dimensional structure is achieved. Preferably, by performing the second curing step c2) 10%, or preferably 20%, or preferably 40%, or preferably 50% of the final crosslinking density of the three dimensional structure is achieved. In a preferred embodiment of the invention the curing is intentionally stopped before achieving the full cure. This is advantageous if for a selected material properties shall preferably be shifted in direction of lower hardness and higher elongation at break properties.

In a preferred embodiment of the invention the interfacial layer to layer tensile strength of the applied material after all curing steps is >20% preferably >30%, or preferably >40% compared to the tensile strength of the material formed and cured in a traditional forming process like injection molding. The comparative measurements are made on S2 tensile test members produced by the respective production methods, either according to the inventive 3D printing process or according to the injection molding process at 180° C. To compare the S2 tensile test members a tensile test in direction of layer to layer build according to DIN 53504 is performed.

The comparative measurements could also be performed according to a standard rubber curing process in a heated pressurized form at a suitable curing temperature and time.

The heating and the applying of pressure in any of the curing steps c1), c2) or cz) is preferably performed in an extruder as mentioned before, especially in a screw extruder. The extruder allows a good mixing of all ingredients of the composition of the materials $M_1$ to $M_x$. Furthermore, the start of the curing step c) is preferably achieved in the extruder. Preferably, the extruder comprises an extrusion head which comprises the at least one opening. Preferably, the extrusion head comprises a heated and or cooled pressure unit. The extrusion head allows a controlled feed of material towards the opening or openings of the application tool. The extruder is arranged to control the die swell of the material applied in step a) or layered in step b). Preferably, the opening, is designed to allow for minimum pressure generation at a given extrusion rate. In a preferred embodiment of the application tool, the die is designed to allow for an elongational strain relaxation of the extruded material $M_1$ or $M_x$ before leaving the die. The principle of a die achieving these properties is described by Arburg in their FreeFormer 3D printing professional unit.

Preferably, the curing in any of curing steps c1), c2) or cz) is each achieved in a time range of from 0.5 s to 3000 minutes, or preferably of from 2 s to 600 minutes, or preferably of from 30 s to 400 minutes, or preferably of from 1 minute to 300 minutes. The cured first material $M_1$ will hereinafter be referred to as $M_{1c}$ and the cured further material $M_x$ will hereinafter be referred to as $M_{xc}$. The cured first material $M_{1c}$ or the cured further material $M_{xc}$ is defined as the material after curing step c), which includes curing step c1), c2) and cz).

Preferably, the cured first material $M_{1c}$ or the cured further $M_{xc}$ provides a hardness in a range of from 20 to 98 Shore A, or preferably in a range of from 30 to 95 Shore A, or preferably in a range of from 40 to 85 Shore A, or preferably in a range of from 50 to 80 Shore A. Preferably, the three dimensional structure provides a hardness in a range of from 20 to 95 Shore A, or preferably in a range of from 25 to 92 Shore A, or preferably in a range of from 30 to 90 Shore A, or preferably in a range of from 35 to 85 Shore A.

In a preferred embodiment of the invention the at least one further curing step c2) involves heating and/or irradiating. Ways of heating or irradiating have already been described in the context of curing step c1) which are also applicable for step c2). By heating or irradiating the materials a further crosslinking of the first material $M_1$ or the further material $M_x$ is triggered. In another preferred embodiment of the invention any of the further curing steps c2) to cz) involves humidity and or oxidative crosslinking of the first material $M_1$ or the further material $M_x$ which have already been cured in step c1). Humidity triggered crosslinking is preferably performed in the same manner as mentioned for curing step c1). Oxidative crosslinking is preferably an ambient temperature post-curing process, which preferably is performed as last curing step.

In another preferred embodiment various crosslinking mechanisms may be mixed.

To achieve chemical crosslinking of the material (and of $M_1$ to $M_x$) several methods are suitable for the inventive process. Well known in the rubber industry is crosslinking via sulfur or radical heat induced crosslinking mechanisms (see handbooks of the rubber technology/industry ([Bayer] Handbuch für die Gummi-Industrie. 2. völlig neu bearbeitete Auflage Gebundene Ausgabe—1991), (Rubber Technologist's Handbook, Volume 1, Sadhan K. De, Jim R. Whitei, Smithers Rapra Publishing, 2001)

Other crosslinking mechanisms may involve addition or condensation reactions like the reactions of amines with acids and anhydrides, amine addition to double bonds (Michael reaction), amine reaction with chlorides and bromides, epoxies; isocyanate reaction with water and Zeriwitinoff active hydrogen functions like hydroxy, amine, acids; isocyanate trimerisations and dimerizations, isocyanate reaction with epoxids, silane couplings, water crosslinking, oxidative crosslinking, ionic and hydrogen bonding etc. Furthermore, radiation induced curing via UV or IR activation of e.g. radical reactions, high power radiation activations, heat induced decomposition reactions leading to crosslinking radical reactions starting from peroxides and or diazo compounds and or thermally or photochemically instable (e.g. sterically strained) compounds and others well known to rubber materials. Also crosslinking mechanisms from the coatings and adhesive industries might be suitable for the chemical crosslinking of materials $M_1$ to $M_x$.

In a preferred embodiment of the process the first material $M_1$ or at least one of the further materials $M_x$ comprise a reactive moiety that has a pot-life of >5 h, or preferably >24 h, or preferably >48 h at RT at dry conditions (less than 50% humidity). Preferably, the first material $M_1$ or any of the further materials $M_x$ are stored in a closed package. The pot-life is defined as the period until an increase of the Mooney viscosity MU of >50 MU is achieved.

In a preferred embodiment of the process, the process provides at least one of the following features:
  (1) the curing step c) is started independently for each layer $L_1$ to $L_y$ before, during or after one of the steps a) or b). Preferably, the curing step c) is started for the first layer $L_1$ before step a) and for all following further layers $L_y$, with y ranging from 2 to 100000, before each of they repetitions of step b).
  (2) at least one of the materials $M_1$ to $M_x$ has a Tg below 25° C., or preferably below 15° C., or preferably below 5° C., or preferably below 0° C., or preferably below −5° C. before and/or after curing step c);
  (3) at least one of the materials $M_1$ to $M_x$ has an average molecular weight in a range of from 5 to 5000 kg/mol, or preferably in a range of from 10 to 1000 kg/mol, or preferably in a range of from 20 to 500 kg/mol, or preferably in a range of from 30 to 300 kg/mol as can be measured by gel permeation chromatography against Polystyrene as a standard;
  (4) at least one of the materials $M_1$ or $M_x$ or the three dimensional structure has an elongation at break of >30%, or preferably of >40%, or preferably of >50% after curing step c);
  (5) at least one of the materials $M_1$ or $M_x$ experiences no phase transition above 50° C., or preferably above 40° C., or preferably above 30° C. before and/or after curing step c).

Preferably, the properties (2) and (4) are measured according to the Methods described below. Preferably, the process provides any of the feature combination selected from the group consisting of (1), (2), (3), (4), (5), (1)+(2), (1)+(3), (1)+(4), (1)+(5), (2)+(3), (2)+(4), (2)+(5), (3)+(4), (3)+(5), (4)+(5), (1)+(2)+(3), (1)+(2)+(4), (1)+(2)+(5); (1)+(3)+(4), (1)+(3)+(5); (1)+(4)+(5), (2)+(3)+(4), (2)+(3)+(5), (2)+(4)+(5), (3)+(4)+(5), (1)+(2)+(3)+(4), (1)+(2)+(3)+(5), (1)+(2)+(4)+(5), (1)+(3)+(4)+(5), (2)+(3)+(4)+(5) or (1)+(2)+(3)+(4)+(5).

In a preferred embodiment of the process, step a) or step b), or step a) and step b) is established by utilizing an application tool, wherein the application tool provides at least one of the following features:

I) at least one opening for applying the first material $M_1$ or the further material $M_x$ with an opening surface in the range of from 0.01 to 1000 mm$^2$;
  II) at least one opening for applying the first material $M_1$ or the further material $M_x$ with a diameter in the range of from 5 µm to 5 cm, preferably in the range of from 10 µm to 2 mm;
  III) two to 100 openings;
  IV) an application rate of >10 g/hour, or preferably of >50 g/hour, or preferably in a range of from 10 to 10000 g/hour, or preferably in a range of from 50 to 5000 g/hour;
  V) a temperature in a range of from 50° C. to 400° C.;
  VI) a temperature difference of the application tool opening compared to the temperature of the first material $M_1$ or the further material $M_x$ when leaving the opening of the application tool in a range of from 0° C. to ±50° C. degrees;
  VII) a material temperature directly after the opening in a range of from 50° C. to 250° C., preferably in a range of from 60 to 230° C., or preferably in a range of from 70 to 200° C., or preferably in a range of from 80 to 150° C.;
  VIII) a symmetrical or asymmetrically shaped opening with the largest diameter being <1000 mm, preferably <800 mm, or preferably <500 mm;
  IX) an opening with a potentially variable diameter from a smallest to a largest diameter, wherein the largest diameter of the opening is up to 30 times, or preferably up to 40 times, or preferably up to 50 times the diameter of the smallest diameter.

Preferably, the application tool provides one, two, three, four, five, six, seven, eight, nine or all of the features I) to IX) in any combination of these features. The application tool can be any tool a person skilled in the art would select for applying the first material $M_1$ or the further material $M_x$ onto the substrate or the previous layer $L_{y-1}$. The application tool may apply the material $M_1$ or $M_x$ under elevated pressure or at normal pressure. Preferably, the applying of the first material $M_1$ or of the further material $M_x$ is performed at elevated pressure. Preferably, the substrate is movable relative to the application tool or vice versa. Preferably, the precision of the movement of the application tool relative to the substrate is in the range of from 0.01 to 10 mm, or preferably in a range of from 0.03 to 5 mm, or preferably in a range of from 0.05 to 1 mm. Preferably, a movement of the substrate or the application tool relative to each other is performable in all three dimensions X, Y and Z separately.

Preferably, the application tool is selected from the group consisting of a die, a nozzle, a hole, a valve or a combination thereof. If an extruder is used as mixing and transportation tool for the materials $M_1$ or $M_x$, the outlet of the extruder preferably serves as the opening of the application tool. The application tool preferably comprises two or more, preferably up to 100, or preferably up to 80, or preferably up to 50 openings. The application rate of the application tool preferably is higher than 10 g/h, or preferably higher than 50 g/h, or preferably higher than 100 g/h or preferably higher than 200 g/h. Preferably, at least a part of the application tool has a temperature in a range of from 50° C. to 400° C., or preferably in a range of from 60 to 350° C., or preferably in a range of from 80 to 300° C., or preferably in a range of from 100 to 250° C. at the surface of the application tool where the first material $M_1$ or the further material $M_x$ comes into contact with the application tool. Preferably, the viscosity of the heated first material $M_1$ or of the further material $M_x$ during processing and application to the substrate is in the range of from 1 to 150 ME at the maximum processing temperature, or preferably in the range of from 3 to 120 ME or preferably in the range of from 5 to 100 ME.

In a preferred embodiment of the process the die swell ratio of the first material $M_1$ or at least one of the further materials $M_x$ compared to the diameter of the application opening is in the range of 1:1 to 5:1, or preferably in the range of from 1:1 to 3:1, or preferably in the range of from 1:1 to 1:2, or preferably in the range of from 1:1 to 1:1.5. The die swell ratio is defined as the ratio of the diameter of the first materiel $M_1$ or the further material $M_x$ before the application step a) starts and the corresponding diameter of the application tool.

In a preferred embodiment of the process the hardness of the cured material $M_{1c}$ or $M_{xc}$ has increased by at least 5 Shore A points, or preferably by at least 10 Shore A points, or preferably by at least 20 Shore A points compared to the applied material $M_1$ in step a) or the layered material $M_x$ in step b) before curing in step c) has started. Preferably, the curing in step c) provides a chemical crosslinking of the first material $M_1$ or the further material $M_x$. The cured material $M_{1c}$ or $M_{xc}$ comprises curing induced chemical crosslinking of at least 0.01%, or preferably, of at least 0.05%, or preferably of at least 0.1% of the atoms of the respective material.

Preferably, the applying of the first material $M_1$ in step a) or the further material $M_x$ in step b) is performed via an electronic control of at least one part selected from the group consisting of the application tool or the substrate or both. Preferably, the electronic control is performed via a computing system. Preferably, a digital file with three dimensional data (3D data) of the three dimensional structure to be built is stored on the computing system. Preferably, according to the data of the digital file the movement of the application tool or the substrate or both is controlled and coordinated. Alternatively, a mechanical movement of the substrate or the application tool can be used to achieve the three dimensional structure. Preferably, the substrate or the application tool is moved according to a predefined path in a predefined time slot. Preferably, the movement of the substrate or the application tool is limited by a structure which guides the substrate or the application tool along the path.

In a preferred embodiment of the process the applying of the materials including at least one material $M_1$ or $M_x$ in step a) or step b) is executed according to digital data related to the shape of the three dimensional structure which are established and provided by a computer aided process. The digital data might be provided in any form the person skilled in the art would select for the providing digital date. Preferably, the execution according to digital data is achieved by a digital 3D file selected from the group consisting of STL, AMF, PLY, OBJ, X3D or a combination of at least two thereof. Preferably, after the step a) or step b) the shape of the material $M_1$ or $M_x$ stays essentially unchanged. Essentially, unchanged according to the invention means that in each spatial direction the dimension of the material $M_1$ or $M_x$ does not vary more than 5%, or preferably not more than 2%, or preferably not more than 1% in each spatial direction, compared to the shape directly after the applying step a) or the layering step b). Alternatively or additionally, unchanged according to the invention means that in each spatial direction the dimension of the material $M_1$ or $M_x$ does not vary more than 5 cm, or preferably not more than 2 cm, or preferably not more than 1 cm in each spatial direction, compared to the shape directly after the applying step a) or the layering step b).

The three dimensional structure produced according to the inventive process are 3D shaped forms via a 3D printing process starting from ultra-high viscosity liquids at RT formulations including an application step via a piston and/or extruder driven die controlled by a CAD data file and a consecutive and or parallel crosslinking step in or outside the building volume. The three dimensional structure may be produced from one or many different materials $M_1$ to $M_x$ used simultaneously or intermixing or consecutively. The product may be built on any 3D or 2D shaped fouls or on a substrate from any other production process.

The three dimensional structure preferably incorporates rubbery properties. To provide a rubbery property at least one of the following properties has to be achieved for the three dimensional structure:

[1] a Shore A hardness in a range of from 20 to 98 Shore A or preferably in a range of from 30 to 90 Shore A, measured according to DIN 53505,
[2] a bending modulus, measured according to DIN EN ISO 178, of <1000 MPa, preferably of <500 MPa
[3] an elongation at break of >30%, or preferably of >50% measured according to DIN 53504 with S2 samples,
[4] a low compression set as tested in DIN 53 517 of <80%, or preferably <60%, or preferably of <50% measured on a cylindrical test piece after 30 min relaxation at RT after compression by 25% for 24 h.

Preferably, the three dimensional structure has two, or preferably three, or preferably all of the features [1] to [4] in any possible combination.

Preferably, at least one of the Materials $M_1$ to $M_x$ has a chemical crosslinking density of >500 g/mol, or preferably of >1000 g/mol, or preferably of >5000 g/mol. Preferably, the chemical crosslinking density of one of the fully cured Materials $M_{1c}$ to $M_{xc}$ has a relation of chemical crosslinking density to entanglement crosslinking density of <2, or preferably of <1.5, or preferably of <1.

Preferably, the three dimensional structure shows a temperature dependent loss of modulus E' (MPa) measured in a DMA at shear rates of l/s of less than 80%, or preferably of less than 70%, or preferably of less than 60%, based on the modulus E' at 25° C. when rising the temperature to 150° C.

In a further preferred embodiment of the invention the process for producing the three dimensional structure includes a parallel printing of different materials from $M_1$ or $M_x$ as support materials that can be easily separated from the intended three dimensional structure before or after curing step c). Such different materials could be e.g. water soluble or low temperature melting polymers and waxes.

In a preferred embodiment of the process the application tool or the substrate is arranged to be movable in at least one of the spatial directions X, Y or Z. Preferably, the precision of the movement of the application tool relative to the substrate in each of the spatial directions is in the range of from 0.001 to 5 mm, or preferably in a range of from 0.005 to 2 mm, or preferably in a range of from 0.01 to 1 mm. In another preferred embodiment the substrate will move in the form of linear XYZ displacements or rotational displacements where a simultaneous displacement of the substrate in one, two or all three spatial directions is possible. Preferably, the application tool and the substrate are arranged to be moved relative to each other. In a preferred embodiment of the invention the application tool and the substrate are moved in at least one direction X, Y, Z during at least a part of the process to build the three dimensional structure.

In a preferred embodiment of the process the application tool is arranged to be movable in the spatial directions X and Y and the substrate is movable in Z direction.

In a preferred embodiment of the process the application tool is moveable in Z direction and the substrate is movable in X and Y direction.

In a preferred embodiment of the process the application tool is movable in Z and one other direction and the substrate is moveable in X and Y direction.

In a preferred embodiment of the process the first material $M_1$ or at least one of the further materials $M_x$ is compounded before step c) comprising 100 parts of an ultra-high viscosity polymer, 0 to 300 parts of an organic or inorganic filler, 0 to 150 parts of a plasticizer, 0 to 40 parts of a metal oxide or salt, 0 to 20 parts of an anti-degradent, 0 to 10 parts of process aids, 0 to 20 parts of coagent and 0.1 to 20 parts of a curative. To those skilled in the art a number of suitable compounding ingredients as described are known and can be found e.g. in Rubber Technologist's Handbook, volume 1, Sadhan K. De, Jim R. Whitei, Smithers Rapra Publishing, 2001

In a preferred embodiment of the process the first material $M_1$ or at least one of the further materials $M_x$ is compounded before step c) comprising 100 parts of an ultra-high viscosity polymer, 5 to 100 parts of an organic or inorganic filler, 0 to 100 parts of a plasticizer, 0 to 10 parts of a metal oxide or metal salt, 0 to 10 parts of an anti-degradant, 0 to 5 parts of a process aid, 0 to 10 parts of a coagent and 0.5 to 10 parts of a curative.

In a preferred embodiment of the process the three dimensional structure is cured in step c) at a temperature≥the temperature of the material leaving the application tool.

Preferably, the three dimensional structure or the precursor of a three dimensional structure comprises at least two layers, wherein at least one layer comprises at least a first material $M_1$ or a further material $M_2$ or both, wherein at least one of the materials $M_1$ or $M_2$ has a Mooney viscosity of >10 ME at 60° C. and <200 ME at 100° C. Furthermore, in a preferred process to make the three dimensional structure with at least two different materials $M_1$ and $M_2$, the materials are applied by two different application tools or by two different.

A further aspect of the invention is a three dimensional structure resulting from the inventive process as described before. The three dimensional structure can have any shape or dimension which might be achieved by the afore described process In a preferred embodiment of the three dimensional structure the ratio of chemical crosslinking density to entanglement crosslinking density is in a range of from <2 to >0.05, or preferably of from <1.5 to >0.1, or preferably of from <1 to >0.2.

Preferably, materials $M_1$ or $M_x$ are further characterized by a crosslinking density after full curing which shows a ratio of chemical derived crosslinks to entanglement derived crosslinks of preferably <2, or preferably <1.5, or preferably <1.

In a preferred embodiment of the three dimensional structure the three dimensional structure has a dimension in a range of 1 mm*1 mm*1 mm to 2 m*2 m*10000 m.

In a preferred embodiment of the three dimensional structure as described before or produced according to the process according to the invention the three dimensional structure is at least a part of one of the following objects selected from the group consisting of a mattress, a seat, a shoe, a sole, an insole, a shoe sole, a helmet, a protector, a handle, a garment, a tire, a damper, a spring, a timing belt, a drive belt, a hose, a bearing, a bellow, an air spring, a wristlet, a sieve, a membrane, a sealing, an O-ring, a rubber tube, a gasket, a tube, a net, a rope, a protective suit or a combination of at least two thereof. Furthermore, preferably the three dimensional structure is at a part of one of the following objects selected from a mill cover, a roll cover, a fastener, a seal, a driving belt, a timing belt, a conveyor belt, a grip, a bumper, a thick structured coating, an elastic textile, a rubber glove and any other applications where rubber materials are materials of choice due to their specific properties or any combination of at least two thereof.

Preferably, the three dimensional structure according to the invention is a product wherein the product has dimensional variations in the X, Y or Z axis of not more than 2 times preferably not more than 5 times, or preferably not more than 10 times the thickness of the narrowest point of the thinnest layer applied in step a) or layered in step b).

The first material $M_1$ or the further material $M_x$ which is preferred for use in an additive manufacturing process provides at least one of the following features:
 i. a Mooney viscosity of >10 ME at 60° C. and of <200 ME at 100° C.;
 ii. a glass point ($T_g$) below 25° C.;
 iii. a glass point ($T_g$) below 5° C.;
 iv. a glass point ($T_g$) below −5° C.;
 v. the ability to be cured at a temperature above $T_g$.
 vi. comprises an ultra-high viscosity material with a mean molecular weight in a range of from 5 to 5000 kg/mol, or preferably in a range of from 10 to 1000 kg/mol, or preferably in a range of from 50 to 500 kg/mol.

Methods:
 1. Mooney viscosity: the Mooney viscosity is measured according to DIN 53523. The Mooney viscosity is measured according to DIN 53523, with the large rotor, 1 min preheating and 4 min measurement interval, known in the prior art as ML 1+4.
 2. Shear viscosity: the shear viscosity is measured in a Wells/Brookfield cone-plate-viscosimeter at a shear rate of l/s at 25° C. Alternatively, the shear viscosity is measured in a Göttfert Rheograph 2003 Piston diameter: 15 mm, Workrange: ca. 200 mm to 35300 $mm^3$=35 ml, Piston speed: 1 mm/s Nozzle geometry L/D=20 mm/2 mm, Temperature: 100° C., 2 Minutes preheating then start extrusion, Shear rate: 225 l/s, extrusion speed: 56 mm/s.
 3. Hardness: The Shore A hardness is measured according to DIN 53505.
 4. Bending modulus: the bending modulus is measured according to DIN EN ISO 178.
 5. Tensile testing: The tensile strength, tensile modulus and elongation at break are measured according to DIN 53504.
 6. Compression set: The compression set is measured according to DIN 53517.
 7. Glass transition temperature $T_g$: The $T_g$ is measured according to DIN 53765.
 8. Chemical crosslinking/entanglement crosslinking density: The chemical crosslinking density and ratio of entanglement crosslinks compared to chemical crosslinking density can be conveniently assessed by using Flory-Rhener theory for equilibrium swelling of crosslinked networks in ideal solvents in combination with mechanical stress-strain testing. This method is described in detail in: Polymer, Volume 30, Issue 11, November 1989, Pages 2060-2062
 9. Temperature dependent modulus E': is measured between 25° C. and 150° C.: in a DMA (dynamic mechanical analysis) https://en.wikipedia.org/wikiiDynamic_mechanical_analysis, at shear rates of 1/s between 25° C. and 150° C.

10. Vulkanisation: moving die Rheometer, Alpha Technologies MDR 2000E, at 180° C.

Experimental Part

All necessary materials to compose the first material $M_1$ or any of the further materials $M_x$ were mixed in a two-step process, first in a 1.51 internal mixer at 40° C. mixer temperature and secondly on a 2 roll mixer at 20° C. roll temperature. First the ultra-high viscosity liquid was plasticized in the internal mixer. After that, the further ingredients were added starting with filler, then plasticizer, then Metal Oxide, then process aid, then coagent and finally curative. The overall 2 step process took up to 30 minutes. The addition of the ingredients was performed in such a way that optimal distribution of the ingredients was ensured. The temperature of the material did not exceed 100° C. during the mixing process.

The inventive compositions according to table 1 were further processed on the roll to achieve 2 mm thin sheets of rubber formulations which were then processed and tested according to standard rubber methods, e.g. Mooney viscosity, vulcanization testing, pressure vulcanisation of S2 test specimen, tensile testing, Shore A measurements. Further the material was used for providing feedstock for the process for producing a three dimensional structure, also called 3D printing process, as described below.

All inventive formulations have been purchased from Lanxess AG, Germany as ready mixed compounds.

All comparative examples have been purchased from Amazon.de as 3 mm diameter filaments on a spool and in case of Autodesk PR48 purchased from CPS Colorado photopolymer solutions.

Formulations:

TABLE 1

Examples of inventive compositions/compounds (*) to build material $M_1$ or $M_x$

| Example | 1* | 2* | 3* | 4* | 5* |
|---|---|---|---|---|---|
| Ingredients phr [parts per hundred rubber] | | | | | |
| THERBAN AT 3404 | 100 | | | | |
| PERBUNAN 2831 F | | 100 | | | |
| LEVAPREN 600 | | | 100 | | |
| BAYPREN 210 | | | | 100 | |
| KELTAN 2470L | | | | | 100 |
| CORAX N 550/30 | 30 | 30 | 30 | 30 | 30 |
| SUNPAR 2280 | | | | | 5 |
| UNIPLEX 546 | 5 | 5 | 5 | 5 | |
| RHENOFIT DDA-70 | 1.4 | 1.4 | 1.4 | 1.4 | 1.4 |
| VULKANOX ZMB2/C5 | 0.4 | 0.4 | 0.4 | 0.4 | 0.4 |
| MAGLITE DE | 2 | 2 | 2 | 2 | 2 |
| ZINKOXYD AKTIV | 2 | 2 | 2 | 2 | 2 |
| PERKADOX 14-40 B-PD | 7 | 2 | 7 | 1.5 | 7 |
| KETTLITZ-TAIC | 1.5 | | 1.5 | | 1.5 |

The ingredients were compounded to achieve compounds 1* to 5*.
This was achieved by the following steps:

| Compounding | 1* | 2* | 3* | 4* | 5* |
|---|---|---|---|---|---|
| Mixing | | | | | |
| calculated density g/ccm | 1.182 | 1.177 | 1.252 | 1.388 | 1.107 |
| Mixing steps | | | | | |
| Internal mixer 1.5 liter volume | | | | | |
| Mixing Step | 1 | 1 | 1 | 1 | 1 |
| Parameters | | | | | |
| RPM: 1/min 40 | | | | | |
| Stamp pressure: bar 8 | | | | | |
| Temperature [° C.]: 40 | | | | | |
| Roll mixer as mentioned above | | | | | |
| Mixing Step | 2 | 2 | 2 | 2 | 2 |
| Parameters | | | | | |
| RPM 1/min 20 | | | | | |
| Temperature [° C.] 30 | | | | | |

| Vulcanisation | 1* | 2* | 3* | 4* | 5* |
|---|---|---|---|---|---|
| Moving-Die-Rheometer (MDR2000E) | | | | | |
| Nr | 1 | 2 | 3 | 4 | 5 |
| Parameter | | | | | |
| Test temperature ° C. | | | 180 for all samples | | |
| Test time min | | | 30 for all samples | | |
| Torque minimum [Nm] | 0.54 | 0.67 | 0.21 | 1.29 | 0.62 |
| Torque maximum [Nm] | 17.77 | 19.23 | 16.9 | 23.22 | 28.81 |
| Torque end [Nm] | 17.62 | 19.21 | 16.83 | 23.21 | 28.78 |
| T 10% [sec] | 47.33 | 41.28 | 36.85 | 36.02 | 47.75 |
| T 25% [sec] | 76.53 | 65.3 | 49.04 | 58.29 | 75.53 |
| T 30% [sec] | 86.63 | 73.98 | 53.39 | 67.28 | 85.51 |
| T 50% [sec] | 134.33 | 116.55 | 78.45 | 112.35 | 134.95 |
| T 70% [sec] | 205.83 | 183.36 | 129.99 | 181.83 | 215.3 |

TABLE 1-continued

Examples of inventive compositions/compounds (*) to build material $M_1$ or $M_x$

| | | | | | |
|---|---|---|---|---|---|
| T 80% [sec] | 263.82 | 238.68 | 178.86 | 255.24 | 282.96 |
| T 90% [sec] | 365.82 | 337.92 | 268.86 | 439.62 | 403.53 |
| T 95% [sec] | 467.31 | 446.52 | 361.53 | 725.01 | 528.63 |
| tan D end [rad] | 0.04 | 0.02 | 0.02 | 0.02 | 0.01 |

| Example | 1* | 2* | 3* | 4* | 5* |
|---|---|---|---|---|---|
| Mooney (viscosity) ML1 + 4 | | | | | |
| Rotor L | | | | | |
| Preheating min 1 | | | | | |
| Time to measure min 4 | | | | | |
| Temperature ° C. 60 | | | | | |
| ML 1 + 4 ME | 142 | 96 | 74 | 11376 | |

| Example | 1* | 2* | 3* | 4* | 5* |
|---|---|---|---|---|---|
| Mooney (viscosity) ML 1 + 4 | | | | | |
| Rotor L | | | | | |
| Preheating min 1 | | | | | |
| Time to measure min 4 | | | | | |
| Temperature ° C. 100 | | | | | |
| ML 1 + 4 ME | 52 | 40 | 27 | 60 | 36 |
| DSC −100 to 200° C., 20° C./min | | | | | |
| Tg before cure ° C. | −31.5 | −40.4 | −32.9 | −43.0 | −45.1 |
| Tm before cure ° C. | — | — | — | 39.8* | 44.3* |
| Start of vulcanisation ° C. | 140 | 150 | 145 | 140 | 140 |
| Tg after cure ° C. | −30.2 | −37.4 | −29.5 | −41.3 | −42.1 |
| Tm after cure ° C. | — | — | — | — | — |

*only small peaks indicating crystalline content < 10%/weight of formulation. Peaks disappear after curing.
curing -- rubber -- test sheets comparative results of standard rubber manufacture, pressure vulcanized sheets used to cut out tensile test pieces.

| | 1 | 2 | 3 | 4 | 5 |
|---|---|---|---|---|---|
| cure temperature ° C. | 180 | 180 | 180 | 180 | 180 |
| press actual time min | 12 | 12 | 12 | 12 | 12 |
| hardness and tensile strength @ RT (test combination) | | | | | |
| Density g/ccm | 1.2 | 1.2 | 1.2 | 1.4 | 1.1 |
| M10 MPa | 0.5 | 0.5 | 0.4 | 0.6 | 0.6 |
| M25 MPa | 0.8 | 1 | 0.9 | 1.1 | 1.1 |
| M50 MPa | 1.2 | 1.6 | 1.6 | 1.8 | 1.7 |
| M100 MPa | 2.4 | 3.5 | 4.3 | 3.9 | 3.8 |
| M300 MPa | 16.3 | — | — | — | — |
| elongation at break % | 371 | 187 | 215 | 230 | 199 |
| tensile strength MPa | 22.2 | 9.9 | 15.7 | 16.3 | 13.7 |
| hardness ShA vulcanized | 57 | 61 | 58 | 66 | 66 |
| hardness ShA unvulcanized | 11 | 5 | 9 | 36 | 21 |

For 3D printing the materials processed as described above were formed into 2 mm thick sheets on the two roll equipment at 20° C. These sheets were further cut into 1 cm thick stripes which were used as feed for a piston extruder. The piston extruder had a volume of about 35 ml at an internal temperature of 100° C.

In a first experiment the extruder had a round shaped die with a diameter of 2 mm. The head of the extruder was fixed. The material was extruded through the die at 100° C. onto a release substrate fixed on a movable surface. The resulting extrudate in free flow showed a die swell from the 2 mm nozzle to around 2.5 mm thickness. The extrudate rate was about 50 mm/s, the build rate (xy movement of the platform) was about 70 minis. The xyz movement of the platform was coordinated via a computer which had stored a digital file of the three dimensional structure to be built. The distance between the die and the substrate or the previous layer $L_{y-1}$ on the substrate was ca. 1.8 mm to achieve a layer thickness of ≤2 mm and to achieve a continuous contact pressure of the actual layer $L_y$ and previous layer $L_{y-1}$ or substrate. The platform speed was on average higher than the extrusion speed. The build rate was around 600 ml/h.

Following shapes of three dimensional structure were built as example:

A square comprising five layers $L_1$, $L_2$, $L_3$, $L_4$ and $L_5$ of the same material $M_1$. Examples of material $M_1$ are those of table 1 which are marked as inventive. The resulting specimen has a thickness of ca. 1 cm and a square size of ca. 5*5 cm. All materials 1* to 5* have been found to be feasible to produce a square with expected rubber behavior.

Another build shape is a hollow tube with a diameter of ca. 5 cm, a wall thickness of ca. 2 mm and a bight of ca. 8 cm comprising 45 layers of the same material $M_1$. All materials 1* to 5* have been found to be feasible to produce a hollow tube with expected rubber behavior.

Another build shape is a hollow tube with a diameter of ca. 5 cm, a wall thickness of ca. 2 mm and a height of ca. 8 cm comprising 25 layers of the same material $M_1$ and another 20 layers of a material $M_2$. Both materials $M_1$, $M_2$ are those of table 1 which are marked in combination with the printing technology employed as inventive. All materials 1* to 5* have been found to be feasible to produce a hollow tube with expected rubber behavior.

In a second experiment the extruder had a round shaped die with a diameter of 0.4 mm. The head of the extruder was fixed. The material was extruded through the die at 100° C. onto a release substrate fixed on a movable surface. The resulting extrudate in free flow showed a die swell from the 0.4 mm nozzle to around 0.5 mm thickness. The extrudate rate was about 25 mm/s, the build rate (xy movement of the platform) was about 40 mm/s. The movement of the platform was coordinated via a computer which had stored a digital file of the three dimensional structure to be built. The distance between the die and the substrate or the previous layer on the substrate was ca. 0.3 mm to achieve a layer thickness of <0.4 mm and to achieve a continuous contact pressure of the actual layer $L_y$ and previous layer or substrate. The build rate was around 10 ml/h.

Following shapes of three dimensional structure were built as example:

A square comprising thirty layers $L_1$, $L_2$, $L_3$, $L_4$ . . . and $L_{30}$ of the same material $M_1$. Examples of material $M_1$ are those of table 1 which are marked as inventive. The resulting specimen has a thickness of ca. 1 cm and a square size of ca. 5*5 cm. All materials 1* to 5* have been found to be feasible to produce a square with expected rubber behavior.

Another build shape is a hollow tube with a diameter of ca. 5 cm, a wall thickness of ca. 2 mm and a height of ca.8 cm comprising 300 layers of the same material $M_1$. All materials 1* to 5* have been found to be feasible to produce a hollow tube with expected rubber behavior.

Another build shape is a hollow tube with a diameter of ca. 5 cm, a wall thickness of ca. 2 mm and a height of ca.8 cm comprising 200 layers of the same material $M_1$. And another 100 layers of a material $M_2$. Both materials $M_1$, $M_2$ are those of table 1 which are marked in combination with the printing technology employed as inventive (*). All materials 1* to 5* have been found to be feasible to produce a hollow tube with expected rubber behavior.

In all cases the building platform was kept steady at 50° C. during the building time. At this temperature no additional curing of the precursor is initiated.

The viscosity of the ultrahigh viscosity polymer formulation was chosen to achieve a sufficient green strength (geometrical stability) of the 3D shaped product before complete curing step. The materials M were formulated to have a viscosity of 20 to 70 Mooney (ME) according to DIN 53523 at 100° C.

After the build is finished, the three dimensional structure is moved into a 180° C. oven for final cure. Time of cure can be chosen according to be $t_{80}$+5 min according to a Vulkameter curing test at 180° C. according to DIN 53529 using an Alpha Technologies Moving-Die-Rheometer (MDR2000E), for this experiment curing time was 15 minutes.

The curing can take place under pressure (e.g. at ca. 10 bar water vapor pressure or at 5 bar pressure under an inert liquid) or at atmospheric pressure. In the following examples atmospheric pressure in a hot air was chosen to achieve in combination with the chosen formulations and peroxide foamed 3d printed rubber sample, used for cutting out S2 test specimen.

In the inventive examples 3D printed tensile test specimen (0.4 mm die, 25 mm/s extrusion rate) of singular Material M were tested at room temperature according to DIN 53504. The tensile test member was cut out of the cured three dimensional structure.

In addition Shore A hardness was measured on the 3D printed samples cut out from the 5 cm diameter, 8 cm height tube in unvulcanized, pressure vulcanized (180° C. silicone oil, 5 bar in autoclave) and atmospheric hot air oven vulcanized state.

The received 3D printed test specimen were compared to a tensile test members that were cut out of a at 180° C. for 12 minutes press-molded 2 mm thick rubber sheet Non inventive/comparative samples e.g. low viscosity materials, engineering thermoplasts and elastic thermoplastic materials are listed in table 2 The inventive examples are marked by a * in table 1 above.

Since the inventive samples for tensile testing were cured under atmospheric pressure they showed foaming in respect to the amount of peroxide used.

Results:
Inventive trials are identified by a*
3D Printing by extrusion through 2 mm nozzle/die to form 2 mm thick material layers.
Göttfert Rheograph 2003
Piston diameter: 15 mm
Workrange: ca. 200 mm-35300 mm³=35 ml
Nozzle geometry L/D=20 mm/2 mm
Temperature: 100° C., 2 Minutes preheating then start filament forming

| 1.* Pressure build in Göttfert capillary viscosimeter at 100° C. and with a 2 mm die, extrusion speed: 56 mm/s, shear rate 225 (1/s) (piston speed: 1 mm/s) | | | | | |
|---|---|---|---|---|---|
| Compound | 1* | 2* | 3* | 4* | 5* |
| Pressure in bar | 278 | 253 | 160 | 259 | 227 |
| Viscosity calculated in Pa*s | 3100 | 2800 | 1800 | 2900 | 2500 |
| Diameter of extrudate after extrusion [mm] | 2.40 | 2.69 | 2.40 | 2.68 | 2.50 |

3D Printing by extrusion through 0.4 mm nozzle to form material layers. Göttfert Rheograph 2003
Piston diameter: 15 mm
Workrange: ca. 200 mm-35300 mm³=35 ml
VOLCANO-NOZZLE-175-0400
Nozzle geometry L/D=0.6 mm/0.4 mm
Temperature: 100° C., 2 minutes preheating time, then start printing

| 2.* Pressure build in Göttfert capillary viscosimeter at 100° C. and with a 0.4 mm die, extrusion speed: 11 mm/s, shear rate 225 (1/s) (piston speed: 0.008 mm/s) | | | | | |
|---|---|---|---|---|---|
| Compound | 1* | 2* | 3* | 4* | 5* |
| Pressure in bar | 176 | 160 | 110 | 220 | 123 |
| Diameter of extrudate after extrusion [mm] | 0.5 | 0.54 | 0.45 | 0.55 | 0.55 |

| 3.* Pressure build in Göttfert capillary viscosimeter at 100° C. and with a 0.4 mm die, extrusion speed: 1405 mm/s, shear rate 28000 (1/s) (piston speed: 1 mm/s), | |
|---|---|
| Pressure in bar | 960 580 |

| 4.* Pressure build in Göttfert capillary viscosimeter at 150° C. and with a 0.4 mm die, extrusion speed: 11 mm/s, shear rate: 225 (1/s), piston speed: 0.008 mm/s. | | | | | |
|---|---|---|---|---|---|
| Compound | 1* | 2* | 3* | 4* | 5* |
| Pressure in bar | 96 | | | | 77 |

| 5.* Pressure build in Göttfert capillary viscosimeter at 150° C. and with a 0.4 mm die, extrusion speed: 1405 mm/s, shear rate: 28000 (1/s), piston speed: 1 mm/s. | |
|---|---|
| Pressure in bar | 760 640 |

To print a S2 test specimen (stl file, positioned flat in x direction in the middle of the 20 cm*20 cm building platform) as described above, a 0.4 mm nozzle was used at 100° C. nozzle temperature and with 25 mm/s extrusion speed, 40 mm/s build speed, using the Göttfert capillary viscosimeter as an extrusion tool and a self-build x, y, z movable heated platform with a x, y directional tolerance of ≤50 micrometer and a z directional tolerance ≤30 micrometer as a building platform. The platform was heated to 50° C.

Tests were performed on inventive materials printed as described above and cured for 15 minutes at 180° C. at atmospheric pressure. Depending on the amount of peroxide used the samples show various degrees of foaming.

| 6.* Tensile test results from inventive examples 3D printed samples : | | | | | |
|---|---|---|---|---|---|
| Test results | 1* | 2* | 3* | 4* | 5* |
| hardness and tensile strength @ RT (test combination) | | | | | |
| Density g/ccm | 0.6 | 0.9 | 0.6 | 1.1 | 0.5 |
| M10 MPa | 0.3 | 0.5 | 0.2 | 0.5 | 0.3 |
| M50 MPa | 0.6 | 1.3 | 0.6 | 1.6 | 0.7 |
| M100 MPa | 1.2 | 2.7 | 1.7 | — | 1.3 |
| elongation at break % | 192 | 119 | 130 | 91 | 137 |
| tensile strength MPa | 3.3 | 3.5 | 2.4 | 3.1 | 2 |

To measure Shore A hardness, samples were cut out from the 5 cm diameter and 2 mm wall thickness tube shape produced with a 2 mm nozzle and an extrusion speed of 50 mm/s onto a 50° C. heated building platform and cured under atmospheric pressure for 15 minutes at 180° C.:

| 7.*Test results | | | | | |
|---|---|---|---|---|---|
| | 1* | 2* | 3* | 4* | 5* |
| hardness ShA (foam) | 22 | 42 | 35 | 50 | 26 |

To measure Shore A hardness, samples were cut out from the 5 cm diameter and 2 mm wall thickness tube shape produced with a 2 mm nozzle and an extrusion speed of 50 mm/s onto a 50° C. heated building platform and cured under 5 bar pressure in a preheated press with 2 mm distance keepers for 15 minutes at 180° C.:

| 8.* Test results | | | | | |
|---|---|---|---|---|---|
| | 1* | 2* | 3* | 4* | 5* |
| hardness ShA (pressure vulcanized) | 51 | 58 | 52 | 63 | 60 |

Further Shore A test results were measured from inventive examples 3D printed and cut from tube shape uncured:

| 9.* Test results | | | | | |
|---|---|---|---|---|---|
| | 1* | 2* | 3* | 4* | 5* |
| hardness ShA (unvulcanized) | 11 | 7 | 11 | 31 | 18 |

Typical for foamed rubber, the observed modulus values of the inventive examples relate very well to material density while the absolute tensile strength of 3D printed foamed products is strongly dependent on uniformity of foam structure. Typically foamed rubber shows significantly lower tensile strength because the final region of elongation induced modulus increase cannot be reached as can be also found for the 3D printed examples. It could thus be shown that typical rubber properties can be achieved very well by the inventive process of 3D printing of high viscous materials in analogy to standard rubber processing. Thus, the inventive process and materials open a totally new way to address the need for achieving rubber like performance in 3D printed products. By the process according to the invention a flexible, time and cost efficient way of producing sophisticated rubber structures is made possible.

Non Inventive Examples

Alternatively, the inventive materials where processed as 3 mm wide filaments with a X400 PRO FDM printer from German RepRap using a Vulcano nozzle with a nozzle geometry L/D=0.6 mm/0.4 mm at a nozzle temperature of 100° C., 150° C. and 200° C. respectively. In no case could we extrude one of the inventive samples through standard 3D Printing FDM setup. In every case pressure build up was too high and/or filament stability too low to use with standard one or two wheel direct filament feeding equipment like MK8 dual extruder or E3D V6 direct feed extruder.

Examples of Non-Inventive Compositions/Compounds
10. NinjaFlex 3D-Print Filament—3 mm—0.75 kg—Midnight Black
11. VELLEMAN FILAMENT PLA 3 MM SCHWARZ 1 KG
12. Velleman 3 mm ABS Filament—Schwarz
13. PR48-Clear Resin for Autodesk Amber DIP printer The Ninjaflex 3D-Print filament Midnight Black has a mooney viscosity at 100° C.>200 ME 1+4 and showed a phase transition (melting point) >50° C.

The Velleman PLA filament black has a mooney viscosity at 100° C.>200 ME 1+4 and showed two phase transitions above 50° C. (glasspoint and melting point).

The Velleman ABS filament black had a mooney viscosity at 100° C.>200 ME 1+4 and showed a melting point >50° C.

The PR48-clear Resin for the Autodesk Amber DLP printer has a viscosity below 1 Pa*s at 25° C., and Mooney <10 at 60° C.

All comparative examples show distinctly different processing behaviors compared to the inventive examples and printing procedures and significantly inferior product behavior after 3d printing especially regarding change of E-modulus with temperature between 25° C. and 150° C. (no rubber plateau, and a phase transition).

The shore A Hardness only of the Ninjaflex Thermoplastic Polyuretheane comparative example falls into the inventive property range of Shore A Hardness. On the other hand the E-modulus change of the Ninjaflex sample shows a >80% change of E-modulus between 23° C. and 150° C. due to the partial melting and softening of the thermoplastic Polyurethane.

At 100° C. no other non-inventive material could be extruded through a 2 mm or 0.4 mm die using the Göttfert hydraulic piston. The low viscosity PR48 DLP material produced no measurable pressure at 100° C. on either die and showed a continuous gravity driven flow through the die.

The invention claimed is:
1. A process for producing a three dimensional structure, the process including the following steps
a) applying of at least a first material $M_1$ onto a substrate to build a first layer $L_1$ on the substrate;

b) layering of at least one further layer $L_y$ of the first material $M_1$ or of a further material $M_x$ onto the first layer $L_1$, wherein the at least one further layer $L_y$ covers the first layer $L_1$ and/or previous layer $L_{y-1}$ at least partially to build a precursor of the three dimensional structure;

c) curing the precursor to achieve the three dimensional structure;

wherein at least one of the materials $M_1$ or $M_x$ is applied at a Mooney viscosity of >10 ME at 60° C. and of <200 ME at 100° C.

2. The process according to claim 1, wherein the process provides at least one of the following features:
   (1) the curing step c) is started independently for each layer $L_1$ to $L_y$ before, during or after one of the steps a) or b);
   (2) at least one of the materials $M_1$ to $M_x$ has a Tg below 25° C. before and/or after curing step c);
   (3) at least one of the materials $M_1$ to $M_x$ has a molecular weight of 5 to 5000 kg/mol;
   (4) at least one of the materials $M_1$ or $M_x$ or the three dimensional structure has an elongation at break of >30% after curing step c);
   (5) at least one of the materials $M_1$ or $M_x$ experiences no phase transition above 50° C. before and/or after curing step c).

3. The process according to claim 2, wherein step a) or step b) is established by utilizing an application tool, wherein the application tool provides at least one of the following features:
   I) at least one opening for applying the first material in the range of from 0.01 to 1000 mm2;
   II) two to 100 openings;
   III) an application rate of >10 g/hour;
   IV) a temperature in a range of from 50° C. to 400° C.,
   V) a temperature difference of the application tool opening compared to the temperature of the first material $M_1$ or the further material $M_x$ when leaving the opening of the application tool in a range of from 0° C. to ±50° C.,
   VI) a material temperature directly after the opening in a range of from 50° C. to 250° C.,
   VII) a symmetrical or asymmetrical shaped opening with the largest diameter being <1000 mm;
   VIII) an opening with a potentially variable diameter wherein the largest diameter of the opening can change by up to ±500%.

4. The process according to claim 3, wherein the application tool or the substrate is arranged to be movable in at least one of the spatial directions X, Y or Z.

5. The process according to claim 1, wherein the hardness of the cured material $M_{1c}$ or $M_{xc}$ has increased by at least 5 Shore A points compared to the applied material $M_1$ in step a) or $M_x$ in step b) before curing.

6. The process according to claim 1, wherein the applying of the materials including at least one material $M_1$ or $M_x$ in step a) or step b) is executed according to digital data related to the shape of the three dimensional structure which are established and provided by a computer aided process.

7. The process according to claim 1, wherein the first material $M_1$ or at least one of the further materials $M_x$ is compounded before step c) comprising 100 parts of an ultra-high viscosity polymer, 0 to 300 parts of an organic or inorganic filler, 0 to 150 parts of a plasticizer, 0 to 40 parts of a metal oxide, 0 to 20 parts of an anti-degradant, 0 to 10 parts of process aids, 0 to 20 parts of coagent and 0.1 to 20 parts of a curative.

8. The process according to claim 1, wherein the three dimensional structure is cured in step c) at a temperature ≥the temperature of the material leaving the application tool.

* * * * *